June 24, 1924.
G. W. OAKES
1,499,246
PROTECTIVE DEVICE FOR PNEUMATIC TIRE VALVES
Filed Sept. 6, 1922
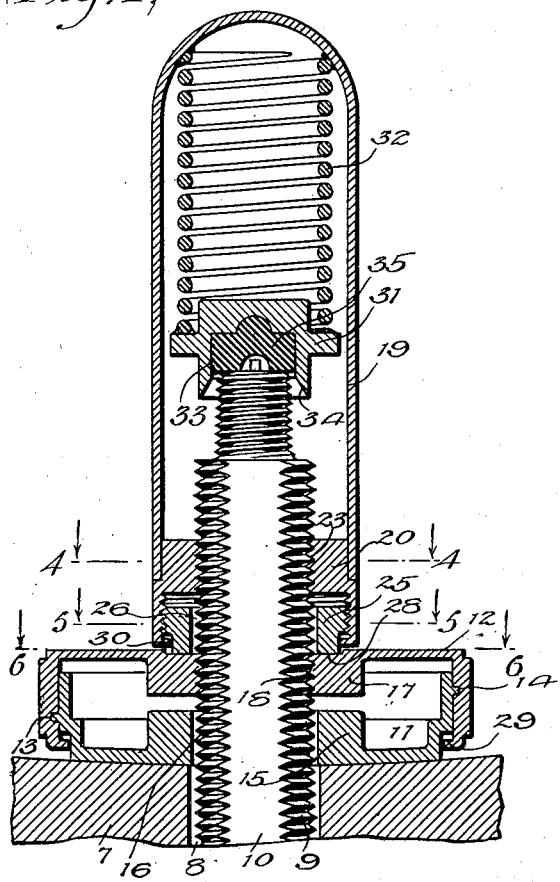
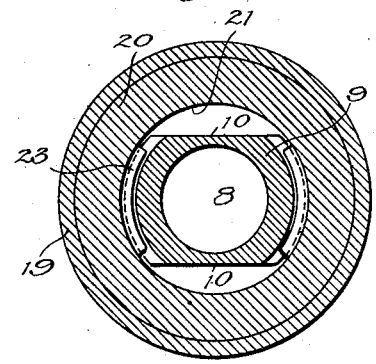
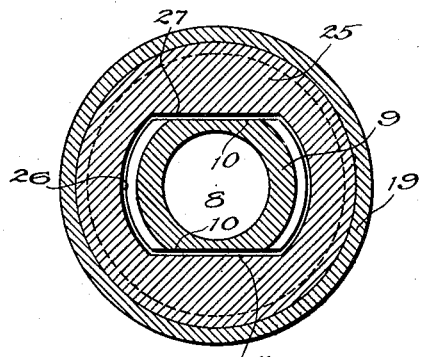
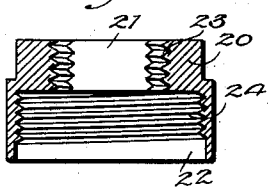
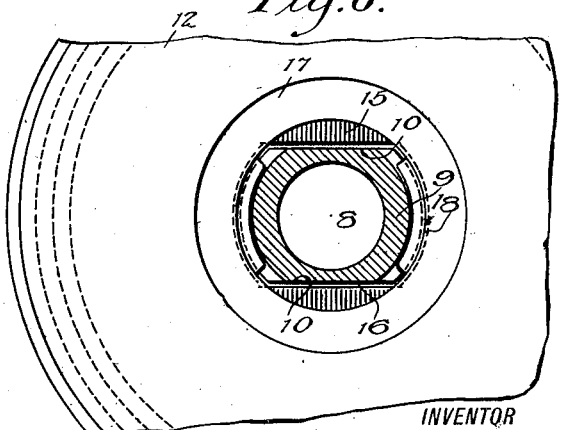
WITNESSES
INVENTOR
George W. Oakes
BY
ATTORNEYS Patented June 24, 1924.

1,499,246

UNITED STATES PATENT OFFICE.

GEORGE WELLS OAKES, OF CRYSTAL CITY, MISSOURI.

PROTECTIVE DEVICE FOR PNEUMATIC-TIRE VALVES.

Application filed September 6, 1922. Serial No. 586,524.

*To all whom it may concern:*

Be it known that I, GEORGE W. OAKES, a citizen of the United States, and a resident of Crystal City, in the county of Jefferson and State of Missouri, have invented a new and Improved Protective Device for Pneumatic-Tire Valves, of which the following is a full, clear, and exact description.

This invention relates to improvements in pneumatic tires, and has particular reference to a protective device for tire valves and tubes.

It is well known that in tire valves now commonly employed with pneumatic tires it is necessary before inflating a tire to unscrew the dust cap from the valve stem for practically the entire length thereof, and thereafter remove the valve cap. Furthermore, before removing the tire from its wheel it is essential, after performing the above operations, to unscrew from the valve stem the felly-engaging nut or ring which is employed to clamp the valve plate carried at the base of the valve stem against the inner surface of the bead of a tire casing and against which the inner end of the dust cap abuts. These operations are ofttimes tedious and consume considerable time.

An object of the present invention is to facilitate the removal of the dust cap and felly-engaging clamping member from the valve stem.

In accordance with the above object the means for clamping the valve plate to the tire casing, and which provides an abutment for the dust cap to prevent the latter from contacting with the felly of the wheel, preferably comprises a pair of cooperating members, one of which is rotatable about and movable longitudinally of the valve stem, while the other member is only movable longitudinally with respect to said stem. The two members cooperate in such manner that when one is given a slight rotation about the valve stem both of the members are moved longitudinally of said stem and are thus adjusted to their operative positions. Further, the means for securing the dust cap on the valve stem also preferably includes two cooperating members, one of which has both rotary and longitudinal movements with respect to the valve stem, while the other has only a longitudinal movement on said stem.

Another object is to eliminate the necessity of unscrewing and replacing the valve cap on the stem by providing means for supporting the valve cap within the dust cap in such manner that the valve cap will close the outer end of the stem and be effectually maintained in its closing position.

The above and other objects will appear more clearly from the following detail description when taken in connection with the accompanying drawing, which illustrates a preferred embodiment of the inventive idea.

In the drawing—

Figure 1 is a vertical longitudinal sectional view showing the application of the invention;

Figure 2 is a detail section of one of the locking members employed in connection with the dust cap;

Figure 3 is a similar view of one of the cooperating members forming the clamping means for securing the valve plate in position with respect to a tire casing;

Figure 4 is a sectional view on the line 4—4 of Figure 1;

Figure 5 is a sectional view on the line 5—5 of Figure 1; and

Figure 6 is a sectional view on the line 6—6 of Figure 1.

Referring more particularly to the drawing the numeral 7 indicates a section of the felly of a wheel and is provided with an opening 8 for receiving the valve stem 9 of a pneumatic inner tube, said stem having its threads interrupted and provided on diametrically opposite sides thereof with flat faces 10.

When securing a tire in position on a wheel it is customary to employ a clamping member, usually in the form of an internally threaded ring or washer, which is threaded upon the valve stem until the same engages the felly of the wheel, whereupon the clamping member is turned so as to draw the valve stem outwardly and thereby securely engage a clamping plate provided at the base of the valve stem against the inner surface of the bead of the tire casing.

The present invention accomplishes this purpose by the provision of a clamping means, preferably comprising a pair of cooperating members 11 and 12, the latter of which is recessed to receive the former and provided upon its inner face with a spirally arranged groove 13 for receiving a flange 14 which is in the nature of a left hand thread. The inner surface of the member 11 is slightly convexed to engage and conform to the contour of the felly 7 and the central portion of said member 11 is enlarged, as indicated at 15 and provided with an opening 16 sufficiently large to receive the valve stem and having the opposite walls thereof flat to engage the flat surfaces 10 of said stem, thus permitting of a longitudinal movement of the member 11 with respect to the stem, but preventing any rotary movement relative thereto. The member 12 is also provided with a central enlarged portion 17 having a screw threaded opening 18 therein designed to engage the threads of the valve stem 9 so as to move the member 12 longitudinally of said stem when said member is rotated thereabout. The threads formed upon the wall of the opening 18 are interrupted in the same manner as those on the valve stem 9 so that when the threads of the member 12 are disengaged from those of the valve stem the member 12 may be freely moved longitudinally of said stem. Thus when the clamping means comprising the members 11 and 12 are first mounted upon the valve stem the member 12 is turned so as to disengage the threads formed upon the wall of the opening 18 from the threads of the valve stem which will enable the clamping means to be moved longitudinally of the valve stem without rotating the member 12 until the inner surface of the member 11 engages the adjacent surface of the felly 7. The member 12 is then given a slight rotary movement to the right or in a clockwise direction to engage the threads formed in the opening 18 with those of the valve stem. This movement will force the member 12 inwardly and due to the arrangement of the groove 13 and flange 14 which provides a left hand thread, it will be apparent that the rotary movement of the member 12 will also cause the member 11 to move inwardly and clamp tightly against the adjacent surface of the felly 7. As this clamping action takes effect the rotation of the member 12 draws the valve stem 9 outwardly and thus pulls the clamping plate (not shown) carried by the inner end of the valve stem against the inner surface of the bead of a tire casing.

The invention further contemplates the provision of a dust cap 19 which has secured to its open end in any preferred manner a locking member 20 having communicating openings 21 and 22 therein, the first named opening being provided with interrupted right hand screw threads 23 adapted to engage with the screw threads of the valve stem. The opening 22 is enlarged with respect to the opening 21 and the wall thereof is provided with a continuous left hand thread 24 designed to be engaged by similar threads formed upon the periphery of a second locking member 25 positioned within the opening 22. The member 25 is provided with a centrally disposed opening 26 formed with flat sides 27, designed to engage the flat sides 10 of the valve stem 9 to prevent rotary movement of the member 25 with respect to said stem.

When mounting the dust cap 19 upon the valve stem the member 20 is first turned to a position at right angles to that shown in Figure 4, so that the threads 23 thereon will be disengaged from the threads of the valve stem, whereupon the dust cap 19 together with the locking members 20 and 25 may be placed over the valve stem and moved longitudinally thereof until the inner surface of the member 25 engages in the recessed portion 28 of the member 17. The dust cap 19 and member 20 are then given a slight turn in a clockwise direction to engage the threads of the member 20 with those of the valve stem to cause further inward movement of the dust cap. At the same time and by reason of the left hand threads of the members 20 and 25 and the fact that the latter member has no rotary movement relative to the valve stem, it will be apparent that the member 25 will also be moved inwardly against the bottom of the recess 28 formed in the member 17. This operation provides a clamping or locking action, which when effected will securely maintain the dust cap in position upon the valve stem.

It will be noted that in Figures 2 and 3 the members 20 and 12 have their inner ends straight so that in assembling the device said members may readily receive the members 25 and 11 respectively. After these parts are assembled the inner ends of said members 12 and 20 are bent inwardly to provide annular flanges 29 and 30 respectively, which prevent the cooperating parts from becoming disassembled.

To further facilitate the operation of inflating a tire the valve cap 31 instead of being threaded upon the outer end of the valve stem 9 in the usual manner is supported within the dust cap 19 by means of a coil spring 32 having one end secured to the inner end of the dust cap and its other end to the valve cap 31. The valve cap is provided with a recess 33 therein having its outer end 34 enlarged or flared so as to readily guide the valve cap into position in engagement with the outer end of the valve stem. Mounted in the recess 33 is a seal 35, preferably made of rubber or other flexible material which engages the outer end of the valve stem and effectually prevents the escape of air from the inner tube of the tire. When the dust cap is placed in position on the valve stem the coil spring 32 is compressed by reason of the engagement of the valve cap with the valve stem and the compression of said spring securely maintains the valve cap in its closing position.

What is claimed is:

1. A device of the class described, comprising a clamping means adapted for mounting on a valve stem and including a pair of cooperating members, one of which is rotatably mounted on said stem and movable longitudinally thereof, and the other member being movable only longitudinally with respect to said stem.

2. A device of the class described, comprising a clamping means adapted for mounting on a valve stem and including a pair of cooperating members one within the other, the first named member having only a longitudinal movement with respect to said stem and the second named member having both longitudinal and rotary movements relative to said stem.

3. A device of the class described, comprising a clamping means adapted for mounting on a valve stem and including cooperating members, one of which is recessed to receive the other, one of said members having only a longitudinal movement with respect to said stem, and the second member having both longitudinal and rotary movements relative to said stem.

4. A device of the class described, comprising a clamping means adapted for mounting on a valve stem and including a pair of cooperating members having screw threaded engagement with each other, one of said members having both longitudinal and rotary movements with respect to said stem and the other member having only a longitudinal movement relative to said stem, the rotary movement of the first named member imparting the longitudinal movement to said second member.

5. A device of the class described, comprising a clamping means adapted for mounting on a valve stem and including cooperating members, one of which is rotatably mounted on and movable longitudinally with respect to said valve stem, the other member being movable only longitudinally of said stem by a partial revolution of the first named member.

6. A device of the class described, comprising a clamping means adapted for mounting on a valve stem and including cooperating members, one of which is recessed to receive the other, one of said members having only a longitudinal movement with respect to said stem, and the second member having both longitudinal and rotary movements relative to said stem, and a dust cap carried by one of said members.

7. A device of the class described for use with a threaded stem of a pneumatic tire, said device comprising two members one of which is slidable on the valve stem and is provided with a portion preventing its rotation thereon and with another portion having left hand threads, the other member being provided with left hand threads engaging the left hand threads of the first member and with right hand threads to engage the threads of the valve stem.

GEORGE WELLS OAKES.